Patented Jan. 22, 1929.

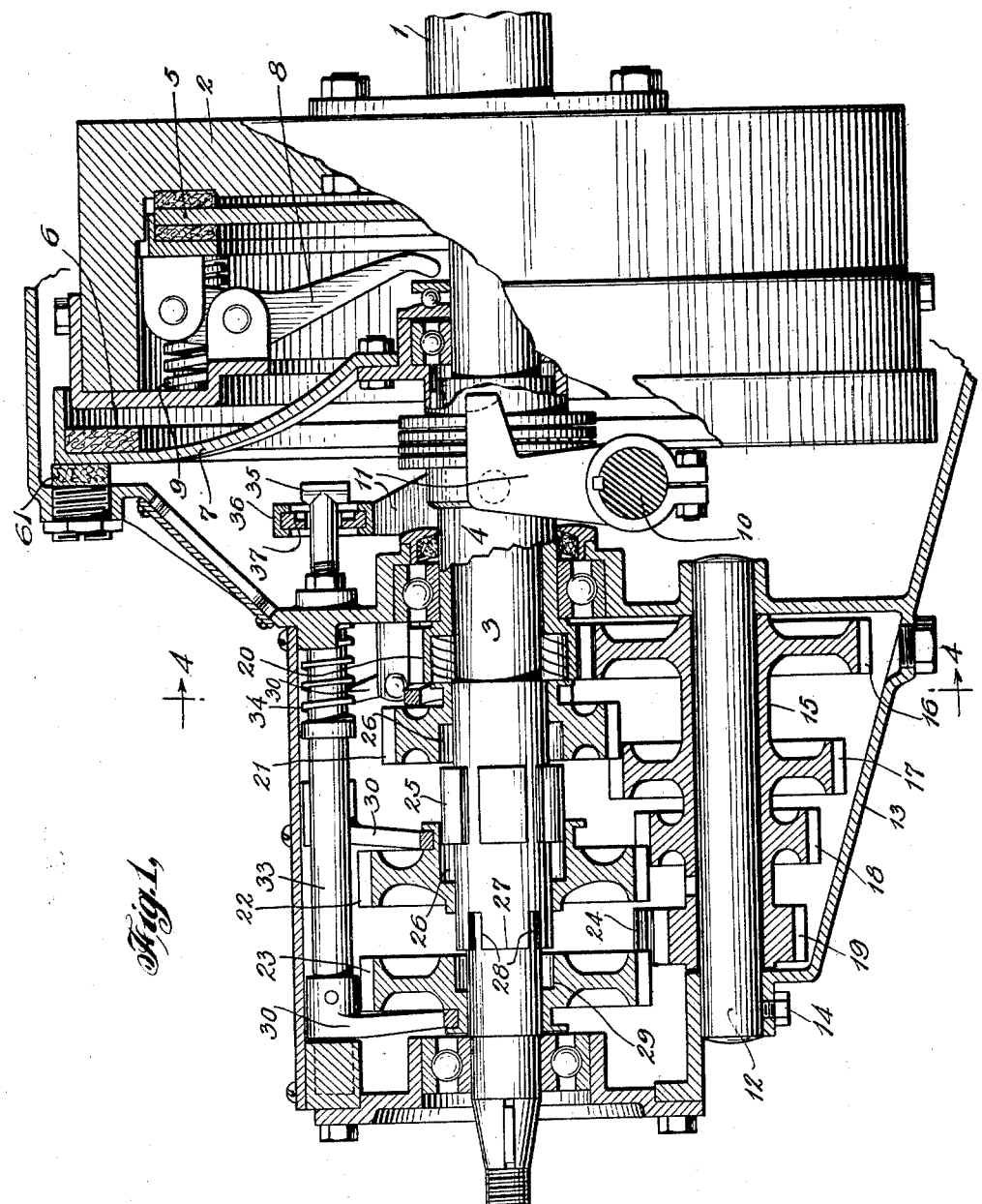

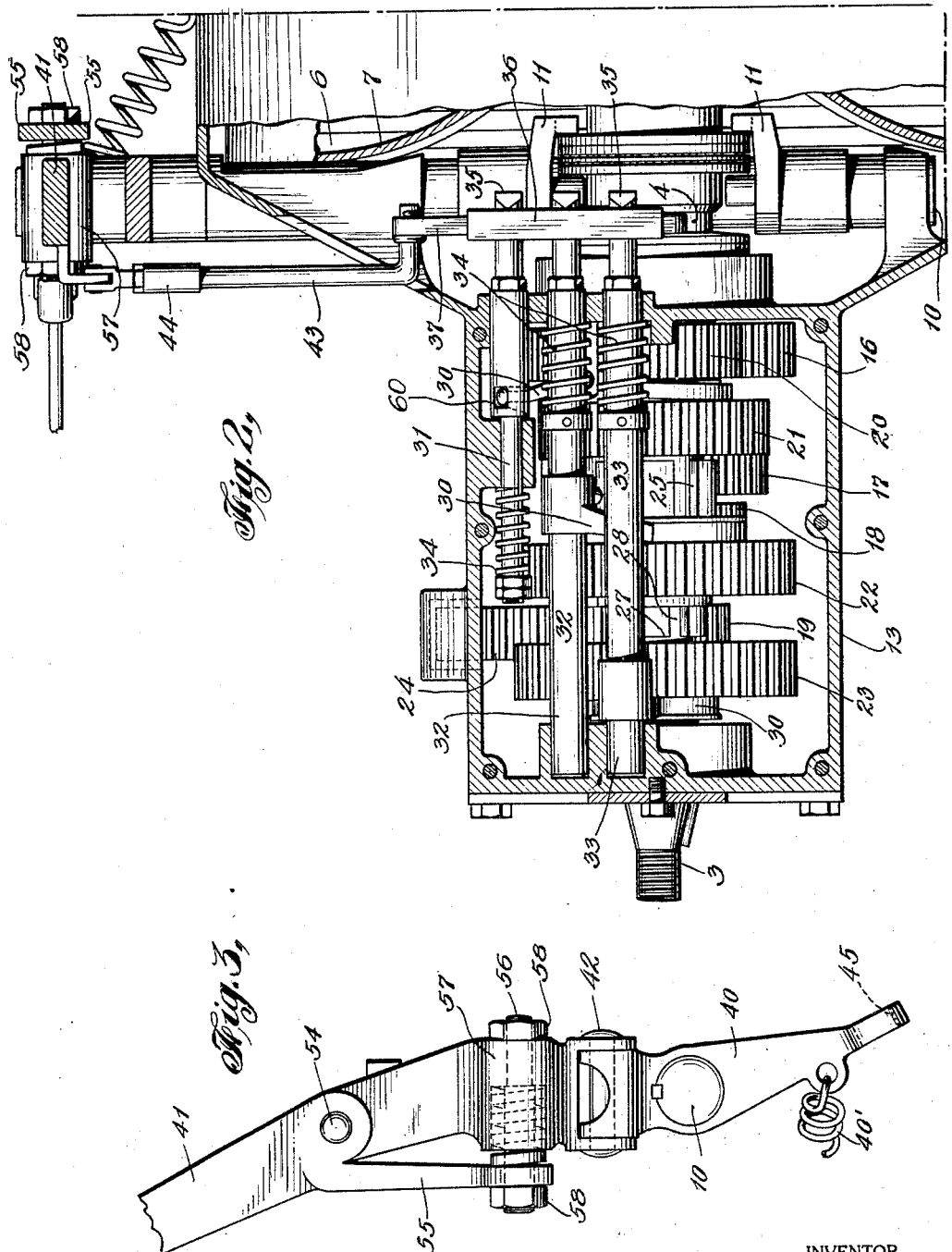

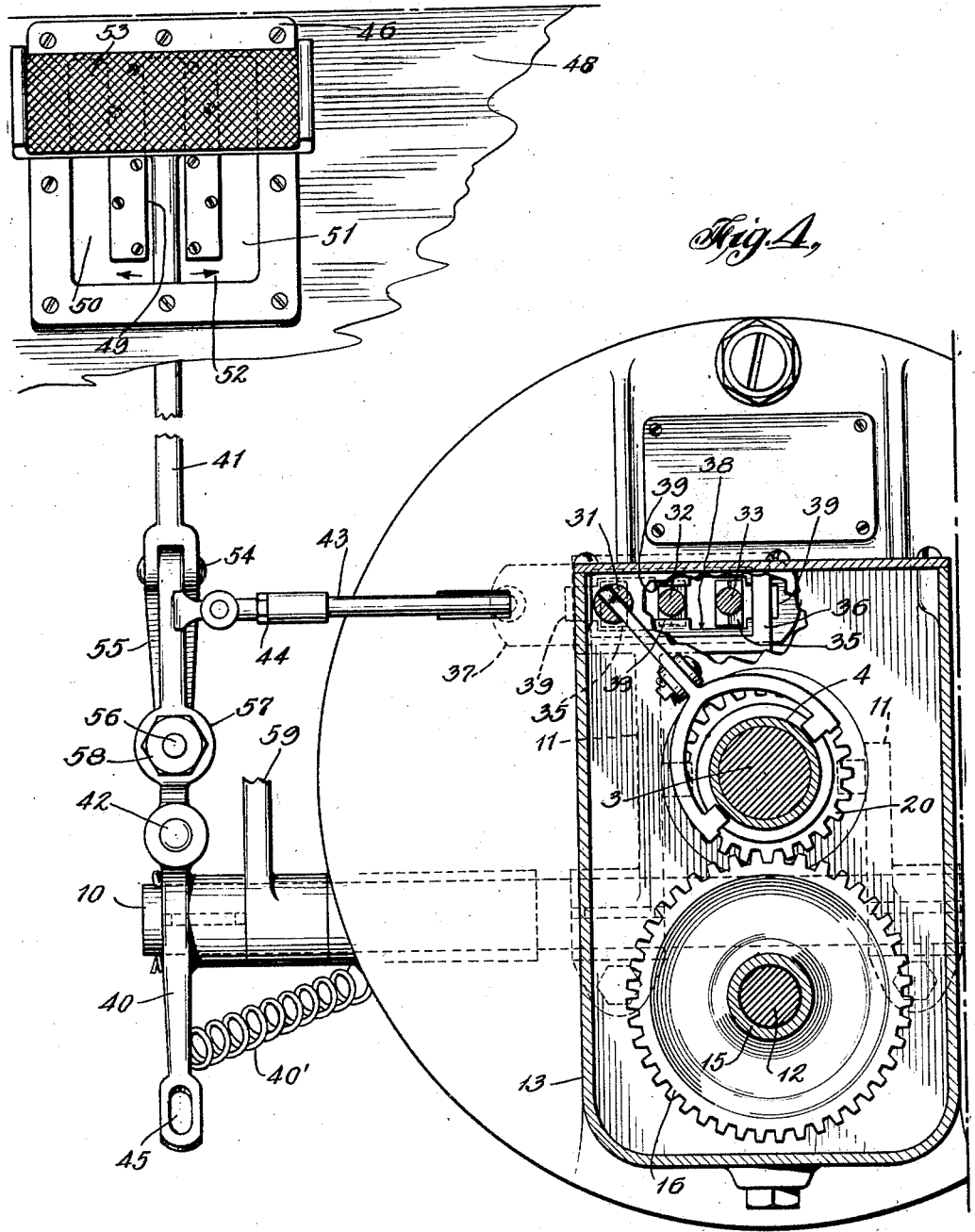

1,699,714

UNITED STATES PATENT OFFICE.

HENRI DANIEL REY, OF PAPEETE, ISLAND OF TAHITI, SOCIETY ISLANDS.

DOUBLE-CLUTCH TRANSMISSION.

Application filed June 30, 1925, Serial No. 40,508. Renewed April 18, 1928.

This invention is an improvement in transmissions, and more particularly in transmissions wherein a single means is provided for operating all of the speeds, including high or direct drive.

In the usual construction of transmission for motor vehicles, the variable speed device includes provisions for connecting the drive and driven shafts at other speeds than high or direct through the intermediary of a transmission shaft.

The selective mechanism is first operated to select the speed usually a train of gears, and connect it to the driven shaft, after which the transmission shaft is clutched to the drive shaft, by means of a separate mechanism.

Thus two mechanisms, and two separate operations are required. The two operations require time, a certain amount of energy, with always the possibility of error, and additional mechanism, increasing thus the cost and complexity of the transmission.

One of the primary objects of the present invention is the provision of a transmission wherein the drive and driven shafts may be coupled at any speed of which the transmission is capable, including high or direct, by a single lever, moving in one direction to perform the operation.

Another object is the provision of a transmission wherein the drive and driven shafts are coupled directly by a normally operative clutch connection, which is so connected and related to the selective mechanism, that the initial movement of the same to connect any speed, other than high, will operate to release the connection, and disengage the shafts.

Another object is the provision of a variable speed device, wherein the gears of each of the trains constituting the speed changing mechanism are always in mesh, and wherein the trains are immobile when the shafts are directly connected.

With these and other objects in view, the invention consists in the construction and combinations of parts described hereinafter, illustrated in the accompanying drawings, and pointed out in the appended claims; it being understood that various changes in the form, proportions, size and minor details of construction, within the scope of the claims, may be resorted to without departing from the spirit of the invention.

In the drawings forming a part hereof;

Fig. 1 is a vertical section through the improved transmission.

Fig. 2 is a plan view, with the gear case in section.

Fig. 3 is a detail in side elevation of a part of the selective lever or pedal.

Fig. 4 is a section on the line 4—4 of Fig. 1.

In the present embodiment of the invention, the transmission includes a motor or drive shaft 1, to which the fly wheel 2 is secured, a driven shaft 3, and a transmission shaft 4, a variable speed device being arranged between the driven and transmission shafts, to connect the two to rotate at different speeds.

The direct connection between the drive and driven shafts is constituted by a clutch indicated generally at 5, and that between the drive and transmission shafts by a clutch indicated generally at 6. The clutch 5 is normally operative, and released when the clutch 6 is operative, the clutches operating in alternation, so that one must be inoperative before the other can be operative. These mechanisms are fully shown and described in my copending applications Serial Nos. 742,417, and 749,413, filed Oct. 8th, and Nov. 12th, 1924, respectively, for which reason they are not described in detail here.

The clutches are operated in alternation by the hub of a spider 7, slidable on the transmission shaft, and which carries the movable member of the clutch 6. The hub engages the inner ends of levers 8, pivoted intermediate their ends in the fly wheel, and carrying at their outer ends the movable member of the clutch 5. The clutch 5 is normally biased to closed or operative position by springs 9. A shaft 10 journalled transversely of the drive shaft carries arms 11 which engage the hub, to move the same, in the manner fully described in the said applications.

The shaft 10 is operated by the selective mechanism of the variable speed device, and the shaft is oscillated to connect the transmission shaft with the drive shaft in sequence with the connection of the selected speed to the driven shaft. The sequence of operations when the shaft 10 is oscillated from the position of Fig. 1 to the full forward position is as follows; disconnection of drive and driven shaft, connection of selected speed to driven shaft, and connection of transmission shaft to drive shaft.

The variable speed device includes a counter shaft 12, held in bearings in the gear case 13 by a set screw 14, and having journalled thereon a sleeve 15, provided with a plurality of gears 16, 17, 18, and 19. The gear 16 meshes with a gear 20, rigid with the transmission shaft, while the gears 17, and 18 mesh with gears 21, and 22 respectively, loosely mounted on the driven shaft. The gear 19 meshes with a gear 24, which is an idler between the gear 19 and a gear 23 on the driven shaft.

The gears 17—21 provide the intermediate speed when the latter is connected to the driven shaft, the gears 18 and 22 the low speed, and the gears 19—23—24 the reverse, and selective mechanism is provided for connecting any of the three gears 21, 22 or 23 to the driven shaft. The said mechanism includes clutch teeth or keys 25 on the driven shaft, either integral or secured thereto, and adapted for engagement with recesses 26 in the gears 21 and 22. The teeth are between the gears, and either gear may be engaged with them to connect the gear to the driven shaft.

The driven shaft is reduced near the end remote from the fly wheel to provide an annular shoulder 27, and the shoulder is notched at 28 to provide teeth for engaging recesses in the gear 23, the recesses indicated at 29. Each of the gears is slidable on the shaft, and each has an annular groove in its hub for receiving a fork on an arm 30, extending from a rod 31, 32 or 33 as the case may be, slidably mounted in the gear case.

The slide rods are mounted alongside each other in the top of the case, and each is normally spring biased in a direction to release the gear associated therewith from the driving shaft, each spring 34 being arranged between a stop collar on the rod and the gear case. The slide rods extend through the wall of the case, and each rod is provided with a head 35 at its outer end.

A guide 36 is supported by one of the arms 11 on the shaft 10, and a slide 37 is movable in the guide. The guide extends transversely of the drive shaft, and it is an open frame through which pass the outer ends of the slide rods, the heads of the rods being in front of the guide, that is between the guide and the fly wheel.

Referring to Fig. 4, it will be seen that the slide is longitudinally slotted at 38, and that the slot has transversely reduced portions 39, the said portions being at the ends and at the center of the slot. The slot is of a width to allow free movement of the rod heads through the unreduced portions thereof, but if a head is in register with a reduced portion 39, it can not pass, and must move forward with the slide and guide.

The slide is a part of the selective mechanism, and the speed selected is determined by its position in the guide. When the slide is moved longitudinally to bring a restricted portion of the slot in register with the head of any rod, and the shaft 10 is then oscillated forwardly, the selected rod must move with the slide and guide which partake in the movement of the arm 11 which supports the guide.

A cross arm 40 is keyed on the shaft 10 near one end thereof, and the arm forms one of the members of a jointed pedal. The other member 41 of the pedal is pivoted to the member 40, as indicated at 42, to swing on an axis transverse to the axis of the shaft 10, and a link 43 connects the member 41 to the slide 37. The link is two-part and adjustable in length as indicated at 44, and it will be evident that when the member 41 is swung on the pivot 42, the slide will move therewith.

A spring 40′ is arranged between the cross arm and a bearing of the shaft 10, to normally hold the pedal in retracted position, and the lower end of the arm is slotted at 45 for engagement by the emergency brake lever, in the same manner as shown in the above mentioned applications. The pivot 42 permits lateral movement of the pedal to select the speed, and means is provided to guide the pedal in its selected position, as it moves to connect the selected speed.

The guide includes a plate 46 which is secured on the foot plate 48 of the car in convenient position, and the plate has three guide slots 49, 50 and 51, parallel and transverse to the axis of the shaft 10. The slots are connected at the rear end of the plate by a cross slot 52, through which the pedal may move into either slot 49, 50 or 51, and the pedal has a foot plate 53 above the plate 46.

When in intermediate or low speeds, it may often be that the driver will not wish to retain his foot on the pedal, after the connection of the speed. To permit removal a second joint 54 is provided in the portion 41 of the pedal and a limited movement is provided for between the portions above and below the joint, by an arm 55 on the portion above the joint, and a bolt 56 in the portion below the joint.

The bolt is slidable in a bearing 57, and has nuts at each end, indicated at 58. The arm 55 has an opening through which the bolt passes, and a spring encircles the bolt in the bearing, between the arm and the pedal. The bolt is of length sufficient to allow a limited movement of the arm toward and from the bearing, and since the nut is outside the arm the portion of the pedal above the joint may move with respect to the portion below the joint, within limits prescribed by the length of the bolt, and the distance between the nut and the bearing.

The pedal and the arms 11 are keyed to the shaft 10, while the brake pedal or lever 59 which is also carried by the shaft 10 is loose thereon. Any suitable means may be provided to hold the pedal 40—41 in its forward position, when in low or intermediate speeds. The spring provides a convenient means for release of the pedal from such holding means, being strong enough to prevent the joint functioning in the normal operation of the pedal.

The operation of the improved transmission is as follows: When for instance the low speed is desired, the pedal is moved forward in the slot 49. Since the parts of the pedal are in normal alinement, the slide remains in the central position of Fig. 4, and the slide rod 32 is moved to connect gear 22 with the driven shaft. The forward movement of the pedal oscillates shaft 10, and the spider 7 is moved forward. The first movement of the spider disconnects clutch 5, if it is in operation, and at the end of its movement clutch 6 is operated to connect the transmission and drive shafts.

Between the disconnection of clutch 5 and that of clutch 6, the transmission is in neutral condition, both clutches at this time being disengaged. To change from the low speed to the intermediate, for instance, the clutch 6 is released by the reverse movement of the pedal. It it is desired to hold the clutch 5—6 in neutral position while the brake pedal is moving through the cross passage 52, the emergency brake lever which as described is connected at 45 to the element 40 may be utilized.

Always clutch 5 is positively operated to release position before it is possible to connect clutch 6. The pairs of gears, 17—21, 18—22 are always in mesh, and the same is true of the assemblage of three gears 19—23—24. Contact is never lost between the several members of the sets or assemblages. It will be understood that the spacing of the restricted portions 39 of the slot in the slide 37 is such that when any restricted portion is in register with a head, the remaining heads are in register with the body of the slot, so that the slide may move forward without engaging the said heads.

It will be noticed that while the arms 30 of the slide rods 32 and 33 are connected to the rods directly, the connection of the rod 31 with the gear 21 is by means of a lever, pivoted intermediately its ends. One end of the lever is forked to engage the groove of the gear, and the other engages a slot 60 in the rod. When the hub 7 is moved in the direction to release the transmission from the drive shaft, the movable member of the clutch 6 engages a friction shoe or brake shoe 61, which brakes and immobilizes the transmission.

What is claimed as new is;

1. A transmission comprising a drive shaft, a driven shaft, a variable speed device including a transmission shaft and a plurality of normally disconnected speed connections between the transmission shaft and the driven shaft, a clutch mechanism including an operating lever to directly connect the drive and the driven shaft when the lever is moved in one direction and to connect the drive and the transmission shaft when the lever is moved in the opposite direction, and selective mechanism operated by said lever to select a speed connection and connect it to the driven shaft after the release of the direct connection and before the connection of the transmission shaft with the drive shaft.

2. A transmission comprising a drive shaft, a driven shaft, a variable speed device including a transmission shaft and a plurality of normally disconnected speed connections between the transmission shaft and the driven shaft, a clutch mechanism including an operating lever to directly connect the drive and the driven shaft when the lever is moved in one direction and to connect the drive and and the transmission shaft when the lever is moved in the opposite direction, and selective mechanism operated by said lever to select a speed connection and connect it to the driven shaft after the release of the direct connection and before the connection of the transmission shaft with the drive shaft, each of the variable speed connections including a train of gears, and means operated by the movable means when moved in a direction to release the direct connection between the drive and the driven shafts to immobilize the gears and trains.

3. A transmission comprising a drive shaft, a driven shaft, a variable speed device including a transmission shaft and a plurality of normally disconnected speed connections between the transmission shaft and the driven shaft, a clutch mechanism including an operating lever to directly connect the drive and the driven shaft when the lever is moved in one direction and to connect the drive and the transmission shaft when the lever is moved in the opposite direction, and selective mechanism operated by said lever to select a speed connection and connect it to the driven shaft after the release of the direct connection and before the connection of the transmission shaft with the drive shaft, each of the variable speed connections including a train of gears, and means operated by the movable means when moved in a direction to release the direct connection between the drive and the driven shafts to immobilize the gears and trains, the trains including a common gear on the transmission shaft.

4. A transmission comprising a drive shaft, a driven shaft, a variable speed device including a transmission shaft and a plurality of normally disconnected speed connections between the transmission shaft and the driven shaft, a clutch mechanism including an operating lever to directly connect the drive and the driven shaft when the lever is moved in one direction and to connect the drive and the transmission shaft when the lever is moved in the opposite direction, and selective mechanism operated by said lever to select a speed connection and connect it to the driven shaft after the release of the direct connection and before the connection of the transmission shaft with the drive shaft, each of the variable speed connections including a train of gears, and means operated by the movable means when moved in a direction to release the direct connection between the drive and the driven shafts to immobilize the gears and trains, the gears of each train always in mesh one with the other.

5. A transmission comprising a drive shaft and a driven shaft, a plurality of gear trains for indirectly connecting the shafts, normally operative means for directly connecting the shafts, a lever moving in one direction to release the connection, means operated by the movement of the lever in the opposite direction to connect any selected train to the drive shaft, and selective mechanism operated by the lever in its movement in the said opposite direction to connect any selected train to the driven shaft and to afterwards connect said train with the drive shaft.

6. A transmission comprising a drive shaft and a driven shaft, a variable speed device for indirectly connecting the shafts at different speeds, said device including a transmission shaft, clutch mechanism including an operating lever movable in one direction to cause said mechanism to directly connect the drive shaft and the driven shaft and movable in the opposite direction to cause said mechanism to connect the drive shaft and the transmission shaft, selective mechanism for the several speeds of the variable speed device, and means whereby the lever may operate the selective mechanism to select the desired speed at the beginning of its movement in the said last named direction.

In testimony whereof he affixes his signature.

HENRI DANIEL REY.